(12) United States Patent
Iwano (10) Patent No.: US 9,751,477 B2
(45) Date of Patent: Sep. 5, 2017

(54) VIBRATION WELDING DEVICE, VIBRATION WELDING METHOD, VIBRATION WELDING MOLD, AND VIBRATION WELDING MOLDED ARTICLE

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/842,456

(22) Filed: Sep. 1, 2015

(65) Prior Publication Data
US 2016/0075080 A1    Mar. 17, 2016

(30) Foreign Application Priority Data

Sep. 16, 2014   (JP) .................................. 2014-187878

(51) Int. Cl.
  *B29C 65/06*       (2006.01)
  *B60R 19/04*       (2006.01)
  (Continued)

(52) U.S. Cl.
  CPC ........ *B60R 19/023* (2013.01); *B29C 65/0618* (2013.01); *B29C 65/7802* (2013.01);
  (Continued)

(58) Field of Classification Search
  CPC ..... B29C 65/0681; B29C 65/70; B60R 19/04; B60R 19/023; B60R 2019/1853;
  (Continued)

(56) References Cited

U.S. PATENT DOCUMENTS 7,637,300 B2 * 12/2009 Kimura ............... B29C 65/0618
                                                     156/580
2009/0211694 A1    8/2009 Hisai et al.

FOREIGN PATENT DOCUMENTS

DE     33 42 619 A1    6/1985
JP     S63-951 U       1/1988
  (Continued)

OTHER PUBLICATIONS

English translation from EPO for DE3342619A1.*
  (Continued)

*Primary Examiner* — Glenn Dayoan
*Assistant Examiner* — Melissa A Black
(74) *Attorney, Agent, or Firm* — Oliff PLC (57) ABSTRACT

A vibration welding device 40 includes: a vibration welding mold that is configured including an upper mold and a lower mold divided in an up-down direction, that is fitted with a first component and a second component forming an elongated shape having a bent portion, and that is disposed with length directions of the first component and the second component along a left-right direction; plural first mold divisions that configure one of the upper mold or the lower mold, and that are divided in the left-right direction; a pressing device that is coupled to each of the plural first mold divisions, and that applies pressure to the first mold divisions; and a vibration device that is coupled to each of the plural first mold divisions, and that vibrates the first mold divisions.

9 Claims, 7 Drawing Sheets

(51) Int. Cl.
 *B60R 19/02* (2006.01)
 *B29C 65/70* (2006.01)
 *B29C 65/78* (2006.01)
 *B29C 65/00* (2006.01)
 *B60R 19/03* (2006.01)
 *B60R 19/18* (2006.01)

(52) U.S. Cl.
 CPC ........ *B29C 66/1312* (2013.01); *B29C 66/301* (2013.01); *B29C 66/547* (2013.01); *B29C 66/721* (2013.01); *B29C 66/73921* (2013.01); *B29C 66/8169* (2013.01); *B29C 66/81431* (2013.01); *B29C 66/81461* (2013.01); *B29C 66/81463* (2013.01); *B60R 19/03* (2013.01); *B60R 19/18* (2013.01); *B29C 66/71* (2013.01); *B29C 66/7212* (2013.01); *B29C 66/929* (2013.01); *B29C 66/949* (2013.01); *B29C 66/9517* (2013.01); *B60R 2019/1853* (2013.01)

(58) Field of Classification Search
 CPC ..... B60R 19/18; B60R 19/03; B60R 66/8169; B60R 66/929; B60R 66/949; B60R 65/0618; B60R 66/9517; B60R 66/7212; B60R 66/71; B29K 2105/08
 See application file for complete search history.

(56) References Cited

FOREIGN PATENT DOCUMENTS

| JP | 2009-202399 A | 9/2009 |
|---|---|---|
| JP | 2010-208056 A | 9/2010 |
| JP | 2010-208058 A | 9/2010 |
| JP | 2012-125948 A | 7/2012 |

OTHER PUBLICATIONS

Feb. 4, 2016 Extended Search Report issued in European Patent Application No. 15185263.9.

Dec. 6, 2016 Office Action issued in Japanese Patent Application No. 2014-187878.

* cited by examiner

VIBRATION WELDING DEVICE, VIBRATION WELDING METHOD, VIBRATION WELDING MOLD, AND VIBRATION WELDING MOLDED ARTICLE

CROSS-REFERENCE TO RELATED APPLICATION

This application claims priority under 35 USC 119 from Japanese Patent Application No. 2014-187878, the disclosure of which is incorporated by reference herein.

TECHNICAL FIELD

The present invention relates to a vibration welding device, a vibration welding method, a vibration welding mold, and a vibration welding molded article.

RELATED ART

A vibration welding molded article described by Japanese Patent Application Laid-Open (JP-A) No. 2010-208056 includes an outside member (a first component) and an inside member (a second component). A jig (vibration welding mold) that vibration welds the vibration welding molded article is configured including a base jig, a first jig, and an auxiliary jig. The first jig is vibrated while a folded section of the outside member is pressed by the auxiliary jig such that the outside member and the inside member are welded together. Plural weld portions are thereby formed along the length directions of the outside member and the inside member.

JP-A No. 2009-202399 also describes a vibration welding molded article.

Securing uniform molding precision (dimensional precision) in the length direction of the outside member and the inside member is difficult in the article states of the outside member and the inside member, since the outside member and inside member are formed in linearly elongated shapes. When a bent portion or the like is formed along some of the length direction of the inside member and the outside member, the molding precision of the bent portion in particular tends to be less than the molding precision of other locations (for example, linear portions). In such cases, the first jig therefore makes contact mainly at locations of the inside member and the outside member that have low molding precision, and there is a possibility that less pressure is applied to other locations of the outside member and the inside member. There is accordingly a concern that continuously welding the outside member and the inside member together along the length directions thereof may not be possible.

SUMMARY

In consideration of the above circumstances, an object of the present invention is to obtain a vibration welding device, a vibration welding method, a vibration welding mold, and a vibration welding molded article capable of continuously welding a first component and a second component together favorably along the length directions thereof.

A vibration welding device of a first aspect of the present invention includes: a vibration welding mold that is configured including an upper mold and a lower mold divided in an up-down direction, that is fitted with a first component and a second component each forming an elongated shape having a bent portion, and that is disposed with length directions of the first component and the second component along a left-right direction; plural first mold divisions that configure one of the upper mold or the lower mold, and that are divided in the left-right direction; a pressing device that is coupled to each of the plural first mold divisions, and that applies pressure to the first mold divisions; and a vibration device that is coupled to each of the plural first mold divisions, and that vibrates the first mold divisions.

In the vibration welding device of the first aspect, the vibration welding mold is provided with the upper mold and the lower mold. The first component and the second component forming an elongated shape having the bent portion are fitted to the vibration welding mold, and the vibration welding mold is disposed with length directions of the first component and the second component along the left-right direction.

Moreover, the pressing device and the vibration device are each respectively coupled to one of the upper mold or the lower mold. Accordingly, the first component and the second component can be welded together along the length directions thereof by using the vibration device to vibrate the one out of the upper mold or the lower mold, while the pressing device presses the one of the upper mold or the lower mold toward the side of the other of the upper mold or the lower mold.

The one of the upper mold or the lower mold is configured as the plural first mold divisions divided in the left-right direction. Appropriate pressure can accordingly be applied to each of the first mold divisions corresponding to respective locations along the length directions of the first component and the second component, even when the first component and the second component form an elongated shape having a bent portion. Continuous welding of the first component and the second component can thereby be performed favorably along the length directions thereof.

A vibration welding device of a second aspect of the present invention is the vibration welding device of the first aspect, wherein the plurality of first mold divisions are each configured movably in the up-down direction and in a front-rear direction, and a position adjusting device is coupled to each of the plural first mold divisions, and positions of the first mold divisions are adjustable by the position adjusting device.

In the vibration welding device of the second aspect, the first mold divisions are configured movable in the up-down direction and the front-rear direction, and the positions of the first mold divisions are configured adjustable by the position adjusting device. The first mold divisions can thereby be disposed at positions corresponding to the welding locations of the first component and the second component by adjusting the positions of the first mold divisions, even when, for example, warping or the like arises in the first component or the second component during molding.

A vibration welding device of a third aspect of the present invention is the vibration welding device of the second aspect, wherein: another out of the upper mold and the lower mold is configured by plural second mold divisions divided in the left-right direction, and the plurality of second mold divisions are each configured movably in the up-down direction and in the front-rear direction; and the position adjusting device is coupled to each of the plural second mold divisions, and positions of the second mold divisions are adjustable by the position adjusting device.

The vibration welding device of the third aspect is configured by the plural second mold divisions of the other out of the upper mold or the lower mold, and the positions of the second mold divisions are configured adjustable by the position adjusting device. The positions of the first mold divisions and the second mold divisions can accordingly be adjusted by the position adjusting device. The first mold divisions and the second mold divisions can thereby be disposed at positions corresponding to the welding locations of the first component and the second component.

A vibration welding method of a fourth aspect of the present invention is a vibration welding method employing the vibration welding device of any one of the first aspect to the third aspect, including a pressuring process that applies pressure to each of the plural first mold divisions, and a welding process that vibrates each of the plural first mold divisions and welds the first component and the second component together.

In the vibration welding method of the fourth aspect, continuous welding can be performed favorably along the length directions of the first component and the second component since the first component and the second component are vibration welded using the first mold divisions.

A vibration welding mold of a fifth aspect of the present invention includes: an upper mold that is fitted with a first component forming an elongated shape having a bent portion, and that is disposed with a length direction of the first component along a left-right direction; a lower mold that is disposed below the upper mold, that is fitted with a second component forming an elongated shape having a bent portion, and that is disposed with a length direction of the second component along the left-right direction; and plural first mold divisions that configure one of the upper mold or the lower mold, that are divided in the left-right direction, and that are each actuated independently from one another by a pressing device and a vibration device.

In the vibration welding mold of the fifth aspect, continuous welding of the first component and the second component can be performed favorably along the length directions thereof using the vibration welding mold.

A vibration welding molded article of a sixth aspect of the present invention is an article molded by the vibration welding method of the fourth aspect, wherein at least one of the first component or the second component is configured from a fiber reinforced resin material.

In the vibration welding molded article of the sixth aspect, since the at least one of the first component or the second component is configured using the fiber reinforced resin material, this component can be configured with comparatively high bending rigidity. Continuous welding can accordingly be performed favorably along the length directions of the first component and the second component even when using a component configured with high bending rigidity A vibration welding molded article of a seventh aspect of the present invention is the vibration welding molded article of the sixth aspect, wherein the first component configures front side bumper reinforcement that configures a front section of bumper reinforcement disposed at a front section of a vehicle, and the second component configures rear side bumper reinforcement that configures a rear section of the bumper reinforcement.

In the vibration welding molded article of the seventh aspect, continuous welding can be performed favorably along the length direction of the bumper reinforcement while achieving weight reduction in the bumper front member, since the one of the components configuring the bumper reinforcement is configured from the fiber reinforced resin material.

Advantageous Effects of Invention

As explained above, the present invention enables the first component and the second component to be welded together favorably along the length directions thereof.

BRIEF DESCRIPTION OF THE DRAWINGS

Exemplary embodiments of the present invention will be described in detail based on the following figures, wherein.

DETAILED DESCRIPTION OF THE INVENTION

Explanation follows regarding bumper reinforcement 10 as a vibration welding molded article according to an exemplary embodiment, with reference to the drawings. The arrows FR, the arrows UP, and the arrows RH in the drawings indicate the vehicle front side, the vehicle upper side, and the vehicle right side (one vehicle width direction side) of a vehicle (automobile) V applied with the bumper reinforcement 10, where appropriate. The explanation below first relates to an attachment state of the bumper reinforcement 10, and subsequent explanation relates to the structure of the bumper reinforcement 10, and a vibration welding device 40 that vibration welds the bumper reinforcement 10.

Attachment State of Bumper Reinforcement 10

Figure 3:
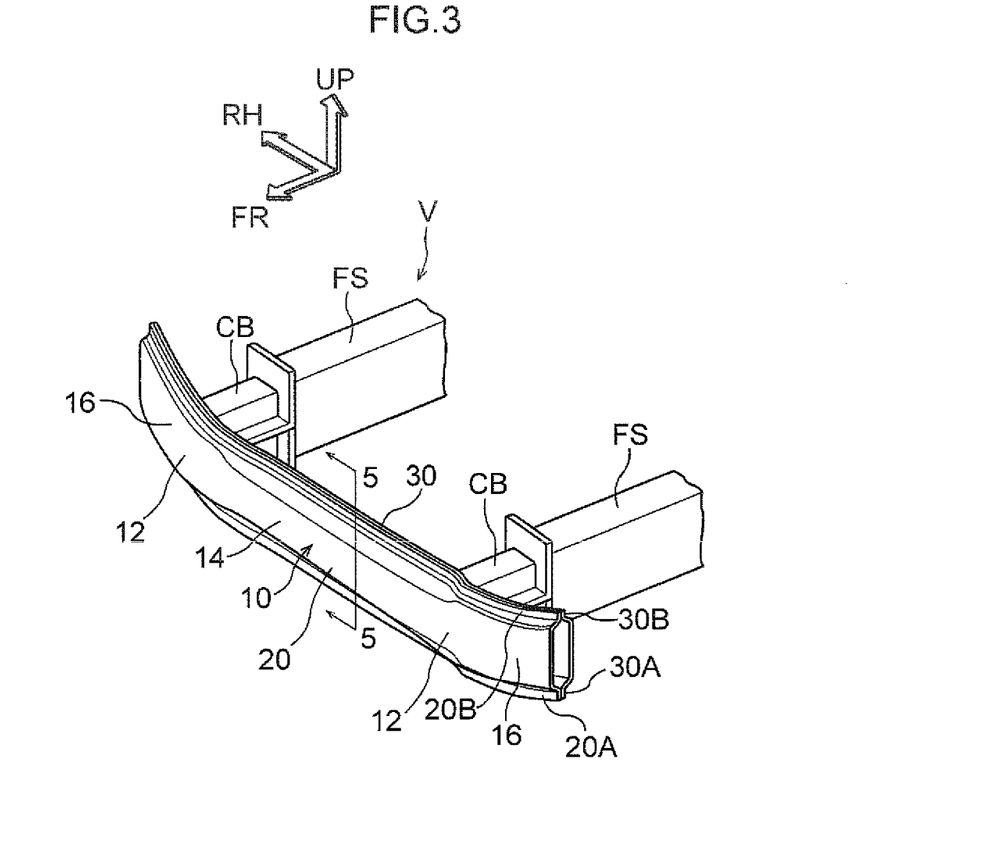
FIG. 3 is a perspective view viewed from the left and diagonally in front of a vehicle illustrating an attached state of bumper reinforcement that is welded using the vibration welding device illustrated in FIG. 1.

As illustrated in FIG. 3, the bumper reinforcement 10 configures a frame member of a front bumper (not illustrated in the drawings) provided to a front end section of a vehicle V. The bumper reinforcement 10 is formed as a hollow pillar, and disposed with the length direction thereof along the vehicle width direction. Both vehicle width direction end portions of the bumper reinforcement 10 bend (curve) diagonally toward the vehicle rear side corresponding to corner sections of the vehicle V, not illustrated in the drawings, and these bent portions configure bent portions 12. A portion of the bumper reinforcement 10 at the vehicle width direction inside of the bent portions 12 configures a bumper reinforcement center portion 14, and portions of the bumper reinforcement 10 at the vehicle width direction outside of the bent portions 12 configure a pair of left and right bumper reinforcement side portions 16.

A pair of left and right front side members FS that have their length directions along the vehicle front-rear direction are provided at the vehicle rear side of the bumper reinforcement 10. The two vehicle width direction end portions of the bumper reinforcement center portion 14 are respectively coupled to front end portions of the front side members FS through crash boxes CB.

Bumper Reinforcement 10

Figure 4:
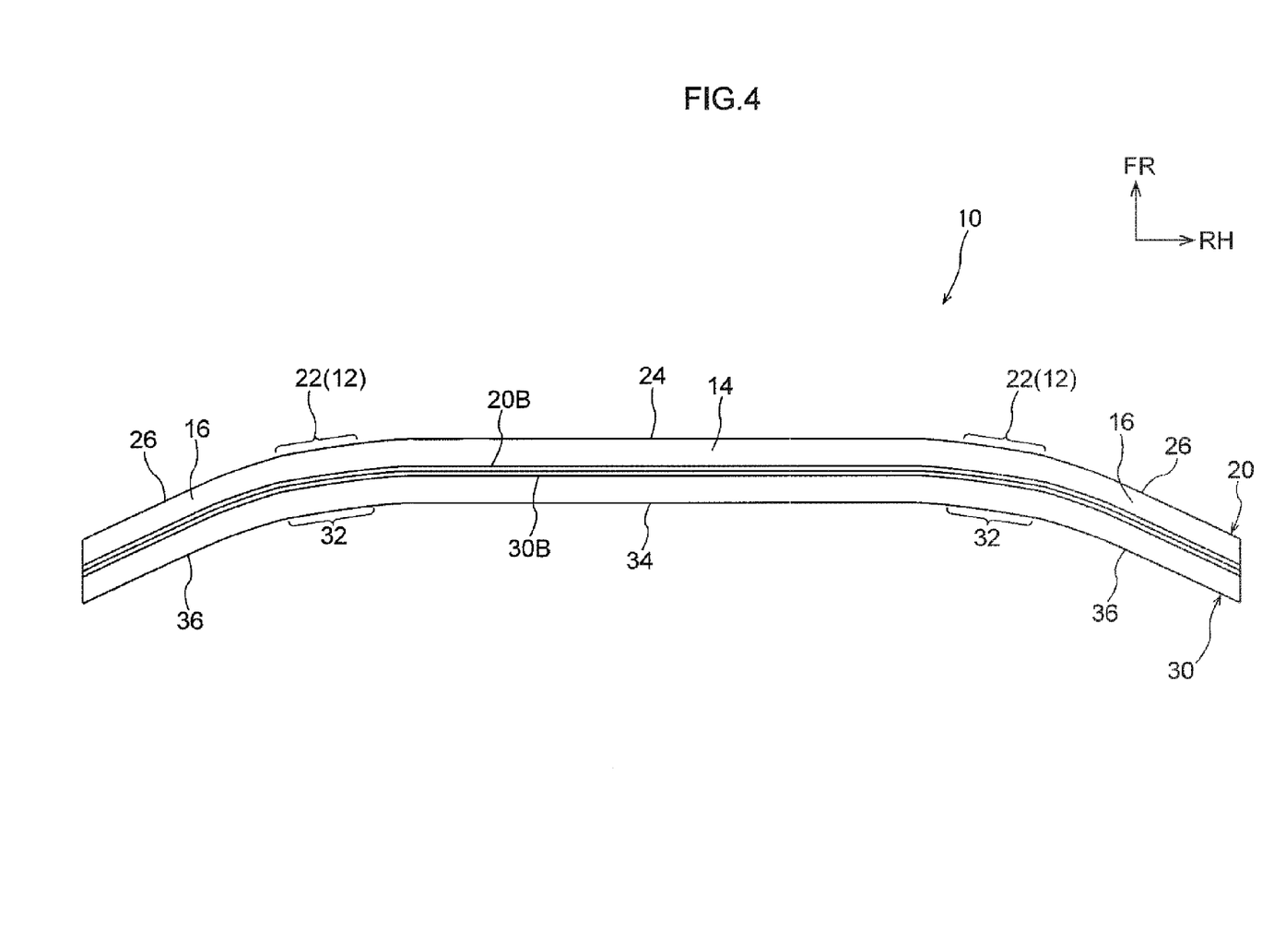
FIG. 4 is a plan view viewed from a vehicle left side illustrating the entirety of the bumper reinforcement illustrated in FIG. 3.
Figure 5:
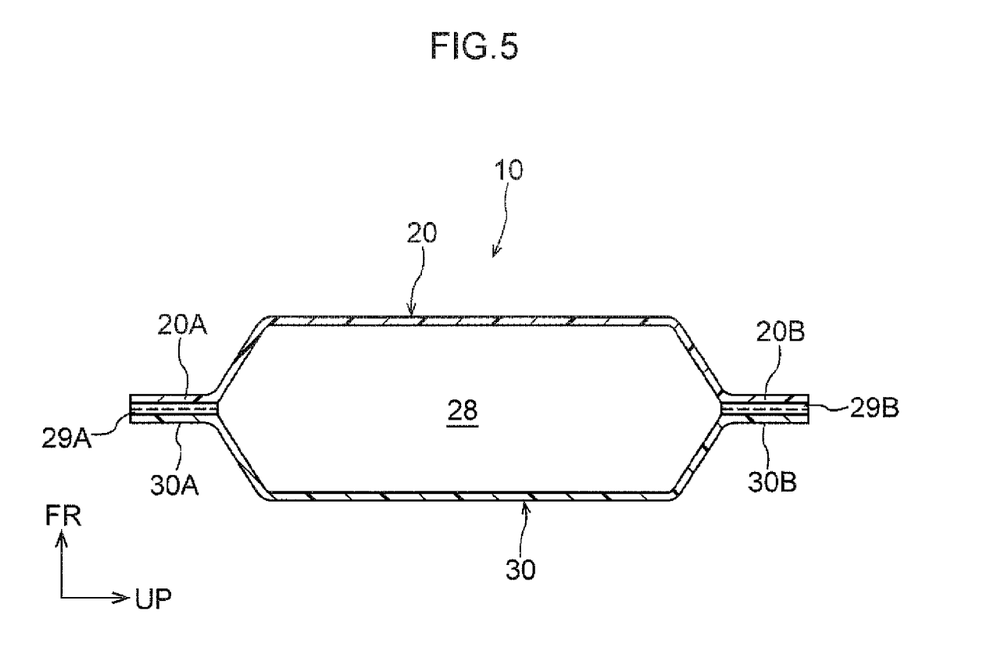
FIG. 5 is an enlarged side cross-section view (a cross-section taken along line 5-5 in FIG. 3) illustrating the bumper reinforcement illustrated in FIG. 3.

As illustrated in FIG. 4 and FIG. 5, the bumper reinforcement 10 forms a structure divided into two in the vehicle front-rear direction. Namely, the bumper reinforcement 10 is configured including front side bumper reinforcement 20 serving as a first component that configures a vehicle front side portion of the bumper reinforcement 10, and rear side bumper reinforcement 30 serving as a second component that configures a vehicle rear side portion of the bumper reinforcement 10.

The front side bumper reinforcement 20 is formed with a substantially hat shaped cross-section open toward the vehicle rear side as viewed along the length direction thereof. A lower end portion of the front side bumper reinforcement 20 configures a first flange portion 20A (see FIG. 5), and an upper end portion of the front side bumper reinforcement 20 configures a first flange portion 20B. The first flange portions 20A, 20B are disposed with the plate thickness directions thereof along the vehicle front-rear direction. As illustrated in FIG. 4, in the front side bumper reinforcement 20, locations that configure the bent portions 12 configure front side bent portions 22 that serve as respective bent portions, a location that configures the bumper reinforcement center portion 14 configures a front side bumper reinforcement center portion 24, and locations that configure the bumper reinforcement side portions 16 configure front side bumper reinforcement side portions 26.

As illustrated in FIG. 5, the rear side bumper reinforcement 30 is formed with a substantially hat shaped cross-section open toward the vehicle front side as viewed along the length direction thereof, and is configured substantially symmetrical to the front side bumper reinforcement 20 along the vehicle front-rear direction. A lower end portion of the rear side bumper reinforcement 30 configures a second flange portion 30A, and an upper end portion of the rear side bumper reinforcement 30 configures a second flange portion 30B. The second flange portions 30A, 30B are disposed with the plate thickness directions thereof along the vehicle front-rear direction. As illustrated in FIG. 4, in the rear side bumper reinforcement 30, locations that configure the bent portions 12 configure rear side bent portions 32 that each serve as a bent portion, a location that configures the bumper reinforcement center portion 14 configures a rear side bumper reinforcement center portion 34, and locations that configure the bumper reinforcement side portions 16 configure rear side bumper reinforcement side portions 36.

As illustrated in FIG. 5, the first flange portion 20A of the front side bumper reinforcement 20 and the second flange portion 30A of the rear side bumper reinforcement 30 are disposed facing each other along plate thickness directions thereof, and both are welded together using the vibration welding device 40 described below. The first flange portion 20B of the front side bumper reinforcement 20 and the second flange portion 30B of the rear side bumper reinforcement 30 are disposed facing each other along plate thickness directions thereof, and both are welded together using the vibration welding device 40. A closed cross-section 28 is thereby formed by the rear side bumper reinforcement 30 and the front side bumper reinforcement 20. A weld portion between the first flange portion 20A and the second flange portion 30A configures a weld portion 29A, and a weld portion between the first flange portion 20B and the second flange portion 30B configures a weld portion 29B.

In the present exemplary embodiment, the front side bumper reinforcement 20 and the rear side bumper reinforcement 30 are configured by a thermoplastic resin material.

More specifically, the front side bumper reinforcement 20 and the rear side bumper reinforcement 30 are formed from a carbon fiber reinforced plastic (CFRP) that includes carbon fiber (CF). CFRP has high strength and is light compared to, for example, metal materials, and is an ideal material for the bumper reinforcement 10. CFRPs are generally called composites. Any thermoplastic resin material out of polypropylene resins, polyamide resins (such as those having abbreviation numbers PA6, PA66, PA610, or PA10T), aromatic polyamide resins, semi-aromatic polyamide resins, polyphenylene sulfide (PPS) resins, polyethylene terephthalate (PET) resins, polybutylene terephthalate (PBT) resins, polycarbonate resins (PC), acrylic (PMMA) resins, ABS resins, and thermoplastic epoxy resins may be employed as the thermoplastic resin material employed in the compound material. Other than carbon fiber, any out of glass fiber (GF), amarid fiber, basalt fiber, bamboo fiber, a metal fiber such as steel, cellulose fiber, and polypropylene fiber (self-reinforcing types) may be employed as the fiber included in the thermoplastic resin material. Namely, the front side bumper reinforcement 20 and the rear side bumper reinforcement 30 are each configured from a fiber reinforced resin material.

Vibration Welding Device 40

Figure 1:
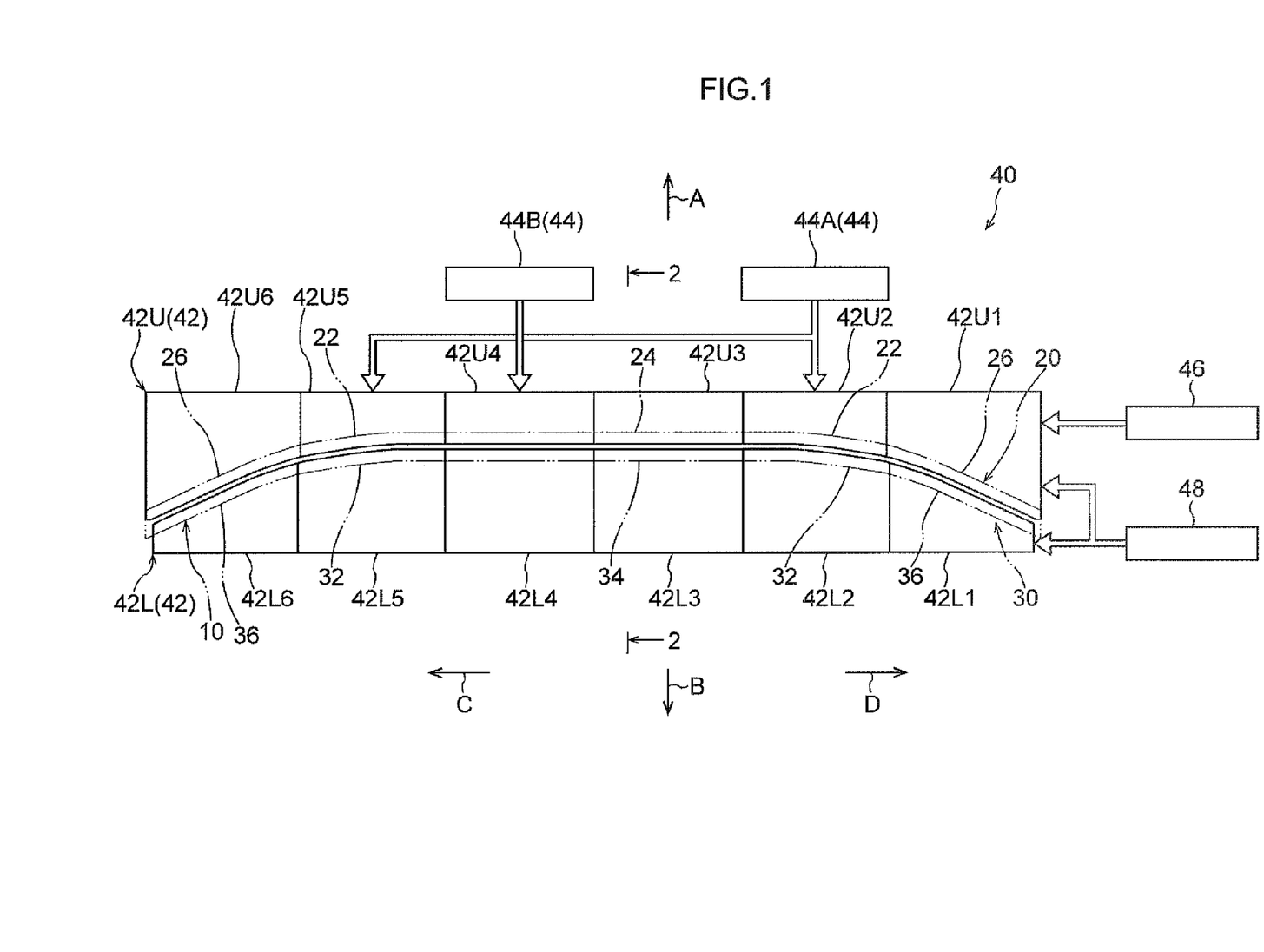
FIG. 1 is a schematic front view illustrating a vibration welding device according to an exemplary embodiment.
Figure 2:
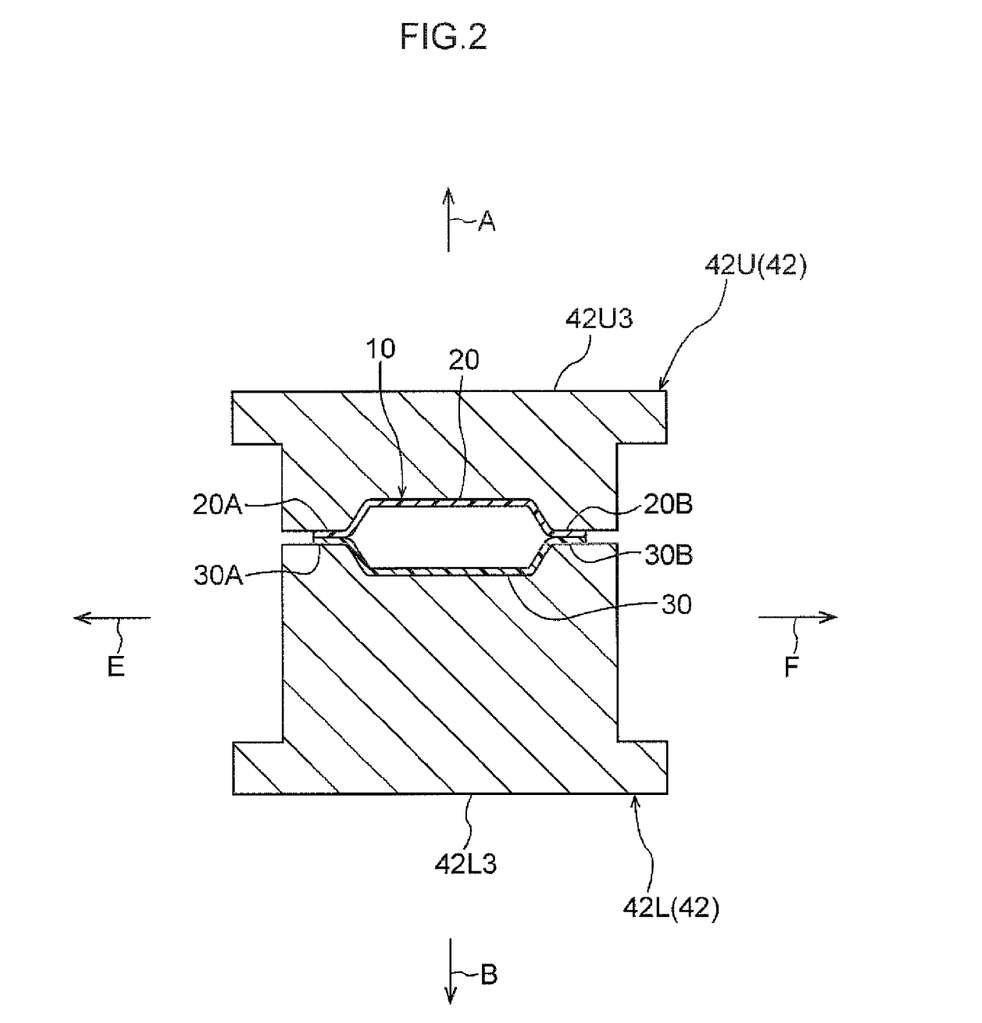
FIG. 2 is an enlarged side cross-section view (a cross-section taken along line 2-2 in FIG. 1) illustrating a vibration welding mold of the vibration welding device illustrated in FIG. 1.

As illustrated in FIG. 1 and FIG. 2, the vibration welding device 40 is a device for welding together the front side bumper reinforcement 20 and the rear side bumper reinforcement 30 described above. Note that in FIG. 1, the arrow A direction and the arrow B direction indicate the up-down direction of the vibration welding device 40, and the arrow C direction and the arrow D direction indicate the left-right direction of the vibration welding device 40. In FIG. 2, the arrow E direction and the arrow F direction indicate the front-rear direction of the vibration welding device 40. The up-down direction of the vibration welding device 40 is aligned with the vehicle front-rear direction, the left-right direction of the vibration welding device 40 is aligned with the vehicle left-right direction, and the front-rear direction of the vibration welding device 40 is aligned with the vehicle up-down direction. Reference simply to up-down, left-right, and front-rear directions in the following explanation refers to up-down, left-right, and front-rear of the vibration welding device 40 unless stated otherwise.

As illustrated in FIG. 1, the vibration welding device 40 is configured including a vibration welding mold 42, a pressing device 44, a vibration device 46, and a position adjusting device 48. The vibration welding mold 42 is configured including an upper mold 42U and a lower mold 42L. The upper mold 42U and the lower mold 42L are each formed from an aluminum alloy material, and the hardness of the front side bumper reinforcement 20 and the rear side bumper reinforcement 30 is greater than the hardness of the upper mold 42U and the lower mold 42L.

The upper mold 42U configures an upper side section of the vibration welding mold 42, and the front side bumper reinforcement 20 is fitted to the upper mold 42U such that the length direction of the front side bumper reinforcement 20 is along the left-right direction. The upper mold 42U is configured by plural molds (six in the present exemplary embodiment) that are divided in the left-right direction. These divided molds respectively configure upper mold divisions 42U1, 42U2, 42U3, 42U4, 42U5, and 42U6, serving as first mold divisions. The upper mold divisions 42U1, 42U6 configuring both left and right end portions of the upper mold 42U correspond to the front side bumper reinforcement side portions 26 of the front side bumper reinforcement 20. The upper mold divisions 42U3, 42U4 configuring left and right intermediate portions of the upper mold 42U correspond to the front side bumper reinforcement center portion 24 of the front side bumper reinforcement 20. The upper mold divisions 42U2, 42U5 correspond to the front side bent portions 22. The upper mold divisions 42U1 to 42U6 are attached to an upper mold plate, not illustrated in the drawings, and configured movable (adjustable) in the up-down direction and the front-rear direction.

The lower mold 42L configures a lower side section of the vibration welding mold 42, and the rear side bumper reinforcement 30 is fitted to the lower mold 42L such that the length direction of the rear side bumper reinforcement 30 is along the left-right direction. Similarly to the upper mold 42U, the lower mold 42L is configured by plural molds (six in the present exemplary embodiment) that are divided in the left-right direction. These divided molds respectively configure lower mold divisions 42L1, 42L2, 42L3, 42L4, 42L5, and 42L6, serving as second mold divisions. The lower mold divisions 42L1 to 42L6 are configured so as to each form a pair with the respective upper mold divisions 42U1 to 42U6 in the up-down direction. More specifically, the lower mold divisions 42L1, 42L6 configuring both left and right end portions of the lower mold 42L form pairs with the upper mold divisions 42U1, 42U6, and correspond to the rear side bumper reinforcement side portions 36 of the rear side bumper reinforcement 30. The lower mold divisions 42L3, 42L4 configuring left-right direction intermediate portions of the lower mold 42L form pairs with the upper mold divisions 42U3, 42U4, and correspond to the rear side bumper reinforcement center portion 34 of the rear side bumper reinforcement 30. The lower mold divisions 42L2, 42L5 form pairs with the upper mold divisions 42U2, 42U5, and correspond to the rear side bent portions 32 of the rear side bumper reinforcement 30. The lower mold divisions 42L1 to 42L6 are attached to a lower mold plate, not illustrated in the drawings, and are configured movable (adjustable) in the up-down direction and the front-rear direction.

The pressing device 44 is configured including a first pressing device 44A and a second pressing device 44B. The first pressing device 44A is respectively coupled to the upper mold divisions 42U2, 42U5, and the second pressing device 44B is respectively coupled to the upper mold divisions 42U1, 42U3, 42U4, 42U6 (in FIG. 1, the second pressing device 44B is illustrated coupled only to the upper mold division 42U4 for convenience). The first pressing device 44A is electrically connected to a controller, not illustrated in the drawings, and is configured to actuate under control by the controller. Configuration is made such that the upper mold divisions 42U1 to 42U6 apply pressure to the side of the lower mold divisions 42L1 to 42L6 when the first pressing device 44A and the second pressing device 44B are actuated with the upper mold 42U and the lower mold 42L in a closed-mold state. More specifically, the pressure applied by the first pressing device 44A is set to 0.5 MPa, and the pressure applied by the second pressing device 44B is set to 0.3 MPa as an example. Namely, the pressure applied to the portions corresponding to the bent portions 12 of the bumper reinforcement 10 is set higher than the pressure applied to the other locations of the bumper reinforcement 10.

The vibration device 46 is respectively coupled to each of the upper mold divisions 42U 1 to 42U6, and is electrically connected to the controller. Each of the upper mold divisions 42U1 to 42U6 are configured to vibrate in the front-rear direction independently from one another when the vibration device 46 is actuated under control of the controller. In the present exemplary embodiment, the vibration device 46 is set with the same vibration conditions (welding conditions) for the upper mold divisions 42U1 to 42U6 as in each of the upper mold divisions 42U1 to 42U6. More specifically, the vibration width is set to 4 mm, the vibration frequency is set to 100 Hz, and the vibration application duration (the vibration welding time) is set to 60 seconds as an example.

The position adjusting device 48 is respectively coupled to each of the upper mold divisions 42U1 to 42U6 and to each of the lower mold divisions 42L1 to 42L6, and is electrically connected to the controller. When the position adjusting device 48 is actuated under control of the controller, the upper mold divisions 42U1 to 42U6 and the lower mold divisions 42L1 to 42L6 are displaced in the up-down direction and in the front-rear direction independently from one another, and the positions of the upper mold divisions 42U1 to 42U6 and lower mold divisions 42L1 to 42L6 can be respectively adjusted.

Figure 6:
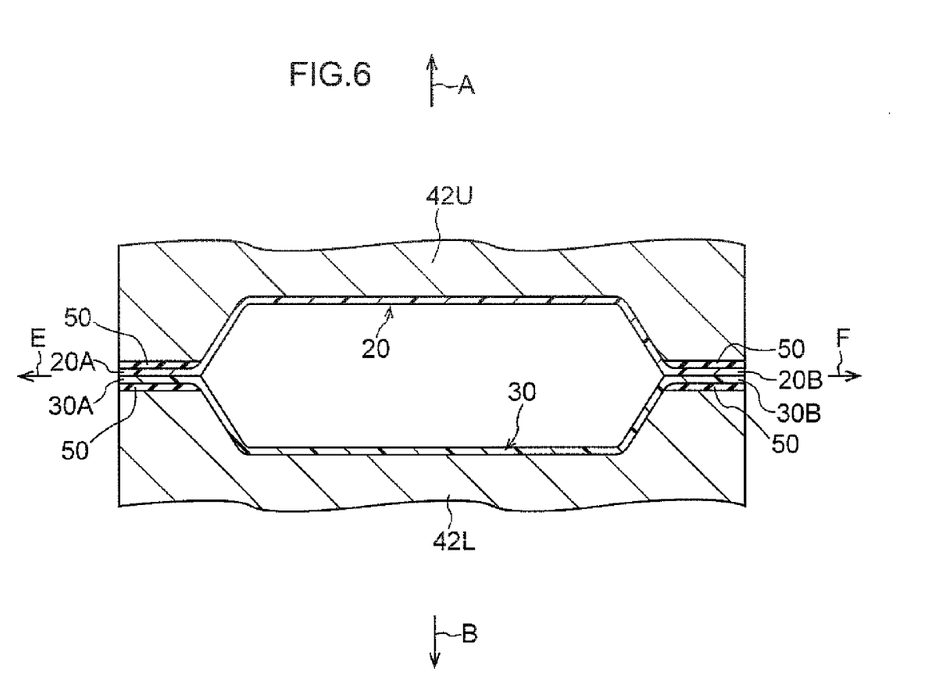
FIG. 6 is an enlarged side cross-section view illustrating a state in which bumper reinforcement is fitted to the vibration welding mold illustrated in FIG. 2.
Figure 7A:
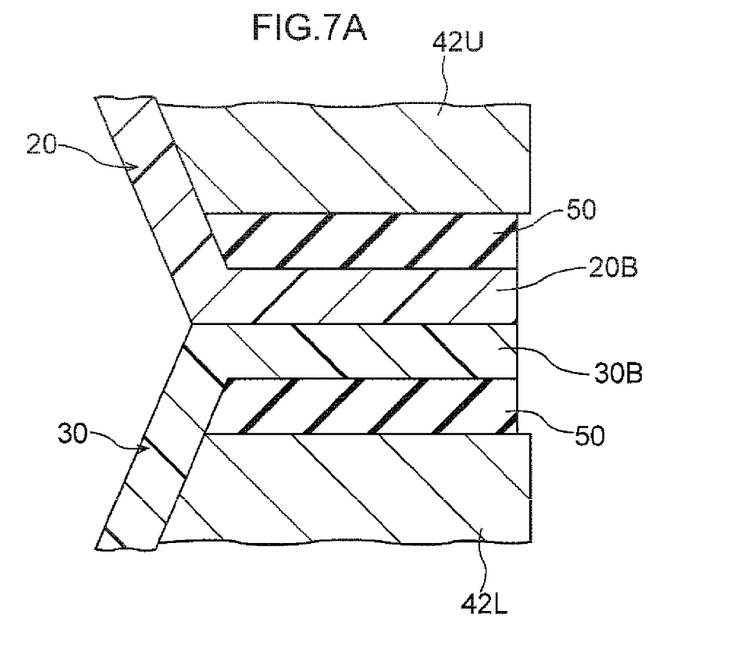
FIG. 7A is an enlarged side cross-section view illustrating a state prior to the first flange portion and the second flange portion illustrated in FIG. 6 being welded together.
Figure 7B:
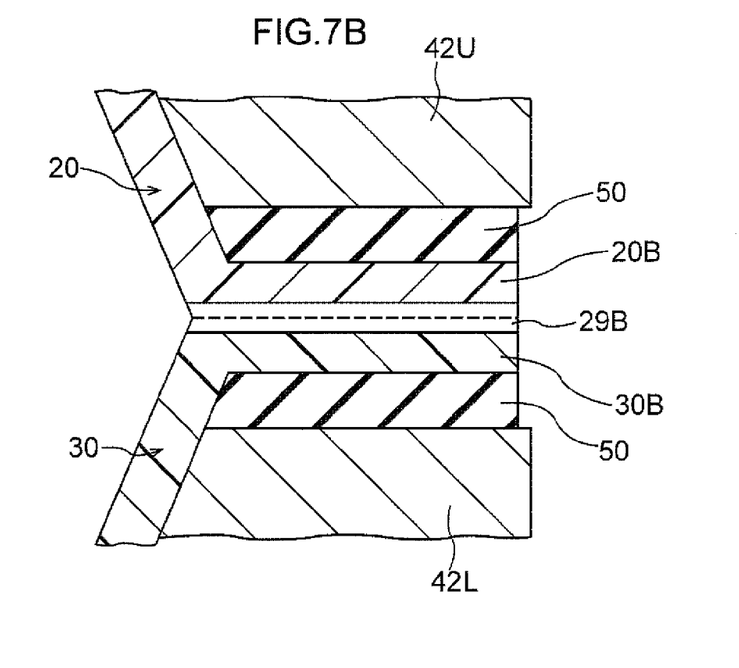
FIG. 7B is an enlarged side cross-section view illustrating a state in which the first flange portion and second flange portion illustrated in FIG. 7A have been welded together.

As illustrated in FIG. 6, FIG. 7A, and FIG. 7B, when the front side bumper reinforcement 20 and the rear side bumper reinforcement 30 are vibration welded using the vibration welding device 40, an adhesion body 50 is provided between the first flange portions 20A, 20B of the front side bumper reinforcement 20 and the upper mold 42U (the upper mold divisions 42U1 to 42U6), and between the second flange portions 30A, 30B of the rear side bumper reinforcement 30, and the lower mold 42L (the lower mold divisions 42L1 to 42L6).

If frictional force between the first flange portion 20A (20B) and the second flange portion 30A (30B) is denoted F1, the adhesive force between the adhesion body 50, and the first flange portion 20A (20B) and second flange portion 30A (30B) is denoted F2, and the adhesive force between the adhesion body 50, and the upper mold 42U and lower mold 42L is denoted F3, then the adhesive forces F2, F3 and the frictional force F1 of the adhesion body 50 of the present exemplary embodiment conform to the inequalities (1) and (2) below.

Frictional force F1<Adhesive force F2≤Adhesive force F3    (1)

Frictional force F1<Adhesive force F3≤Adhesive force F2    (2)

Namely, the adhesive force F2 and the adhesive force F3 of the adhesion body 50 are both higher than the frictional force F1. The magnitudes of the adhesive force F2 and the adhesive force F3 are not particularly limited as long as they are higher than the frictional force F1.

Explanation next follows regarding operation and advantageous effects of the present exemplary embodiment, while also explaining the procedure for vibration welding the front side bumper reinforcement 20 and the rear side bumper reinforcement 30.

First, the front side bumper reinforcement 20 is fitted to the upper mold 42U. When doing so, the upper mold divisions 42U1 to 42U6 are displaced (rendered movable) in the up-down direction and the front-rear direction by the position adjusting device 48, and the positions of the upper mold divisions 42U1 to 42U6 matched to the article shape of the molded front side bumper reinforcement 20 (position adjustment process). The rear side bumper reinforcement 30 is fitted to the lower mold 42L. When doing so, similarly to above, the lower mold divisions 42L1 to 42L6 are displaced (rendered movable) in the up-down direction and the front-rear direction by the position adjusting device 48, and the positions of the lower mold divisions 42L1 to 42L6 are matched to the article shape of the molded rear side bumper reinforcement 30 (position adjustment process).

The upper mold 42U is then displaced downward, and the upper mold 42U is closed against the lower mold 42L. The front side bumper reinforcement 20 and the rear side bumper reinforcement 30 are thereby disposed facing each other in the up-down direction. More specifically, the first flange portion 20A of the front side bumper reinforcement 20 and the second flange portion 30A of the rear side bumper reinforcement 30 are superimposed on each other in the up-down direction, and the first flange portion 20B of the front side bumper reinforcement 20 and the second flange portion 30B of the rear side bumper reinforcement 30 are superimposed on each other in the up-down direction (mold closing process) (see FIG. 6).

In this state, the first pressing device 44A and the second pressing device 44B are actuated, and the upper mold divisions 42U1 to 42U6 apply downward pressure onto the first flange portions 20A, 20B of the front side bumper reinforcement 20 (pressing process). Pressure thereby operates in the up-down direction on the first flange portion 20A and the second flange portion 30A, and pressure operates in the up-down direction on the first flange portion 20B and the second flange portion 30B. In this pressing process, the upper mold divisions 42U1 to 42U6 are each actuated independently from one another, and pressure is applied to the front side bumper reinforcement 20 and the rear side bumper reinforcement 30. When doing so, pressure from the upper mold divisions 42U2, 42U5 is greater than pressure from the upper mold divisions 42U1, 42U3, 42U4, 42U6. More specifically, the pressure from the upper mold divisions 42U2, 42U5 is 0.5 MPa, and the pressure from the upper mold divisions 42U1, 42U3, 42U4, 42U6 is 0.3 MPa, as an example.

The vibration device 46 then vibrates the upper mold divisions 42U1 to 42U6. More specifically, the upper mold divisions 42U1 to 42U6 are simultaneously actuated, and the upper mold divisions 42U1 to 42U6 vibrate in the front-rear direction (the arrow E direction and the arrow F direction in FIG. 2). As illustrated in FIG. 6, frictional heat is thereby generated at location where the first flange portion 20A and the second flange portion 30A are superimposed on each other, the superimposed locations of both are melted, and the weld portion 29A is formed. Similarly, as illustrated in FIG. 7B, the weld portion 29B is formed at locations where the first flange portion 20B and the second flange portion 30B are superimposed on each other. The vibration device 46 simultaneously stops the upper mold divisions 42U1 to 42U6 from vibrating after 60 seconds have elapsed since the vibration device 46 started the vibration. The rear side bumper reinforcement 30 and the front side bumper reinforcement 20 are thereby continuously welded (joined) along the length direction of the bumper reinforcement 10, and the bumper reinforcement 10 is formed as the vibration welding molded article. The bumper reinforcement 10 is then manufactured by removing the bumper reinforcement 10 from the vibration welding mold 42.

As explained above, in the vibration welding device 40 of the present exemplary embodiment, the upper mold 42U of the vibration welding mold 42 is configured by the plural upper mold divisions 42U1 to 42U6, and the lower mold 42L of the vibration welding mold 42 is configured by the plural lower mold divisions 42L1 to 42L6. Appropriate pressure for each location along the length direction of the front side bumper reinforcement 20 and the rear side bumper reinforcement 30 can thereby be applied from each of the upper mold divisions 42U1 to 42U6 to the front side bumper reinforcement 20 and the rear side bumper reinforcement 30, even when the front side bumper reinforcement 20 (the rear side bumper reinforcement 30) includes the front side bent portions 22 (the rear side bent portions 32). Continuous welding of the front side bumper reinforcement 20 and the rear side bumper reinforcement 30 can thereby be performed favorably along the length direction of the bumper reinforcement 10.

More specific explanation follows regarding this point. In the present exemplary embodiment, the front side bent portions 22 are formed to the front side bumper reinforcement 20, and the rear side bent portions 32 are formed to the rear side bumper reinforcement 30, that are the molding subjects. The front side bumper reinforcement center portion 24 and the front side bumper reinforcement side portions 26 of the front side bumper reinforcement 20 extend substantially linearly, and the rear side bumper reinforcement center portion 34 and the rear side bumper reinforcement side portions 36 of the rear side bumper reinforcement 30 also extend substantially linearly. Therefore, molding precision (dimensional precision) generally tends to be lower at locations of the front side bent portions 22 and the rear side bent portions 32 than at other locations in the article state of the front side bumper reinforcement 20 and the rear side bumper reinforcement 30.

Thus when the front side bumper reinforcement 20 is fitted to the upper mold 42U and the rear side bumper reinforcement 30 is fitted to the lower mold 42L, there is a possibility that mainly the front side bent portions 22 and the rear side bent portions 32 are contacted by the upper mold 42U and the lower mold 42L. Thus, if the upper mold 42U were configured as a single-piece mold without dividing, low pressure would be applied to portions other than the front side bent portions 22 and the rear side bent portions 32 (namely, the front side bumper reinforcement center portion 24 and the rear side bumper reinforcement center portion 34, and the front side bumper reinforcement side portions 26 and the rear side bumper reinforcement side portions 36). As a result, there would be a possibility that the welding of the bumper reinforcement center portion 14 and the bumper reinforcement side portions 16 of the bumper reinforcement 10 would be insufficient. Moreover, if high pressure were then applied to the upper mold 42U in order to increase the pressure applied to the portions corresponding to the bumper reinforcement center portion 14 and the bumper reinforcement side portions 16 of the bumper reinforcement 10, the pressing device 44 would need to apply excessive pressure.

In contrast thereto, in the present exemplary embodiment, the upper mold 42U is configured by upper mold divisions 42U1 to 42U6 divided in the left-right direction (namely, in the length direction of the front side bumper reinforcement 20 and the rear side bumper reinforcement 30). The upper mold divisions 42U1 to 42U6 can accordingly apply pressure independently from one another to respective locations along the length direction of the front side bumper reinforcement 20 and the rear side bumper reinforcement 30. The upper mold divisions 42U1, 42U3, 42U4, 42U6 can therefore supply adequate pressure to locations corresponding to the bumper reinforcement center portion 14 and the bumper reinforcement side portions 16 of the bumper reinforcement 10, even when there are portions having relatively low molding precision such as the bent portions 12 along the length direction of the bumper reinforcement 10 that is subject to welding. Thus, pressure operating on the front side bumper reinforcement 20 and the rear side bumper reinforcement 30 can be made uniform along the length direction of the front side bumper reinforcement 20 and the rear side bumper reinforcement 30. The front side bumper reinforcement 20 and the rear side bumper reinforcement 30 can accordingly be continuously welded together favorably along the length direction of the bumper reinforcement 10.

Moreover, as described above, the upper mold divisions 42U1 to 42U6 can change (modify) the pressure applied to respective locations along the length direction of the front side bumper reinforcement 20 and the rear side bumper reinforcement 30 since the upper mold 42U is configured by divided upper mold divisions 42U1 to 42U6. Therefore, even when there are locations along the length direction of the bumper reinforcement 10 subject to welding having relatively low molding precision such as the bent portions 12, the bumper reinforcement 10 can be welded favorably by setting the pressure high only at the upper mold divisions 42U2, 42U5 that correspond to the bent portions 12. In other words, the pressure can be suppressed from becoming high at the upper mold divisions 42U1, 42U3, 42U4, 42U6. The pressure applied to the upper mold 42U by the first pressing device 44A and the second pressing device 44B can therefore be made lower than in a hypothetical case in which the upper mold 42U is configured as a single-piece mold.

The upper mold divisions 42U1 to 42U6 and the lower mold divisions 42L1 to 42L6 are configured movable in the up-down direction and the front-rear direction, and the positions of the upper mold divisions 42U1 to 42U6 and the lower mold divisions 42L1 to 42L6 are configured adjustable by the position adjusting device 48. Therefore, the upper mold divisions 42U1 to 42U6 and the lower mold divisions 42L1 to 42L6 can be disposed at positions corresponding to the first flange portions 20A, 20B and the second flange portions 30A, 30B by moving the upper mold divisions 42U1 to 42U6 and the lower mold divisions 42L1 to 42L6 in the up-down direction and the front-rear direction, even if dimensional deviations such as warping arise in the first flange portions 20A, 20B of the front side bumper reinforcement 20, or the second flange portions 30A, 30B of the rear side bumper reinforcement 30. The front side bumper reinforcement 20 and the rear side bumper reinforcement 30 can therefore be can continuously welded along the length direction of the bumper reinforcement 10 even more favorably.

Moreover, the front side bumper reinforcement 20 and the rear side bumper reinforcement 30 are each configured by carbon fiber reinforced plastic. The front side bumper reinforcement 20 and the rear side bumper reinforcement 30 are therefore configured with relatively high bending rigidity, and can be continuously welded together favorably along the length direction thereof. Moreover, weight reduction of the bumper reinforcement 10 can be achieved by configuring the front side bumper reinforcement 20 and the rear side bumper reinforcement 30 using carbon fiber reinforced plastic.

Although the lower mold 42L of the vibration welding mold 42 is configured from plural lower mold divisions 42L1 to 42L6 in the present exemplary embodiment, the lower mold 42L may be configured as a single-piece mold. Namely, it is sufficient that configuration be made such that at least any mold section coupled to the pressing device 44 and the vibration device 46 is divided in the left-right direction.

Although the pressing device 44 and the vibration device 46 are configured coupled to the upper mold 42U in the present exemplary embodiment, configuration may be made such that the pressing device 44 and the vibration device 46 are coupled to the lower mold 42L. In such cases, the lower mold divisions 42L1 to 42L6 correspond to the first mold divisions of the present invention, and the upper mold divisions 42U1 to 42U6 correspond to the second mold divisions of the present invention.

The pressing device 44 is configured by two pressing devices, these being the first pressing device 44A and the second pressing device 44B, in the present exemplary embodiment; however, the number of pressing devices may be modified to be appropriate for the shape of the vibration welding molded article (bumper reinforcement 10). Namely, the pressure on the respective upper mold divisions 42U1 to 42U6 may be modified to be appropriate for the shape of the vibration welding molded article (bumper reinforcement 10).

Although the front side bumper reinforcement 20 and the rear side bumper reinforcement 30 are both formed from thermoplastic resins containing fibers in the present exemplary embodiment, the rear side bumper reinforcement 30 may be formed from a metal material such as steel, a lightweight metal material such as aluminum, or a metal alloy material or lightweight metal alloy material that can be welded to the front side bumper reinforcement 20.

Although the bumper reinforcement 10 serves as the vibration welding molded article in the present exemplary embodiment, the vibration welding molded article is not limited thereto. For example, the vibration welding molded article may be a vehicle body frame member such as a pillar, rocker, or a member of a vehicle.

What is claimed is:

1. A vibration welding device, comprising:
   a vibration welding mold that is configured including an upper mold and a lower mold divided in an up-down direction, the upper mold being fitted with a first component and the lower mold being fitted with a second component, the first and second components each forming an elongated shape having a bent portion, and the vibration welding mold being disposed with length directions of the first component and the second component along a left-right direction;
   a plurality of first mold divisions that configure one of the upper mold and the lower mold, and that are divided in the left-right direction;
   a pressing device that is coupled to each of the plurality of first mold divisions, and that applies pressure to the first mold divisions in a state in which the upper mold is closed against the lower mold; and
   a vibration device that is distinct from the upper and lower molds, that is coupled to each of the plurality of first mold divisions, and that vibrates the first mold divisions in the state in which the upper mold is closed against the lower mold.

2. The vibration welding device of claim 1, wherein:
   the plurality of first mold divisions are each configured movably in the up-down direction and in a front-rear direction; and
   a position adjusting device is coupled to each of the plurality of first mold divisions, and positions of the first mold divisions are adjustable by the position adjusting device.

3. The vibration welding device of claim 2, wherein:
   another out of the upper mold or the lower mold is configured by a plurality of second mold divisions divided in the left-right direction, and the plurality of second mold divisions are each configured movably in the up-down direction and in the front-rear direction; and
   the position adjusting device is coupled to each of the plurality of second mold divisions, and positions of the second mold divisions are adjustable by the position adjusting device.

4. A vibration welding method employing the vibration welding device of claim 1, the method comprising:
   a pressuring process that applies pressure to each of the plurality of first mold divisions: and
   a welding process that vibrates each of the plurality of first mold divisions and welds the first component and the second component together.

5. A vibration welding mold, comprising:
   an upper mold that is fitted with a first component forming an elongated shape having a bent portion, and that is disposed with a length direction of the first component along a left-right direction;
   a lower mold that is disposed below the upper mold, that is fitted with a second component forming an elongated shape having a bent portion, and that is disposed with a length direction of the second component along the left-right direction; and
   a plurality of first mold divisions that configure one of the upper mold and the lower mold, that are divided in the left-right direction, and that are each actuated independently from one another by a pressing device and a vibration device in a state in which the upper mold is closed against the lower mold, the vibration device being distinct from the upper and lower molds.

6. A vibration welding molded article that is molded by the vibration welding method of claim 4, wherein:
   at least one of the first component and the second component is configured from a fiber reinforced resin material.

7. The vibration welding molded article of claim 6, wherein:
   the first component configures a front side bumper reinforcement that configures a front section of bumper reinforcement disposed at a front section of a vehicle; and
   the second component configures a rear side bumper reinforcement that configures a rear section of the bumper reinforcement.

8. The vibration welding device of claim 1, wherein:
   left and right end portions of the upper mold extend to or extend beyond left and right ends of the first and second components in the left-right direction.

9. The vibration welding mold of claim 5, wherein:
   left and right end portions of the upper mold extend to or extend beyond left and right ends of the first and second components in the left-right direction.

* * * * *